United States Patent
Aggrawal et al.

(10) Patent No.: US 10,997,320 B1
(45) Date of Patent: May 4, 2021

(54) SEGMENT-BASED PERSONALIZED CACHE ARCHITECTURE

(71) Applicant: EMC IP Holding Company LLC, Hopkinton, MA (US)

(72) Inventors: Akhil Aggrawal, Fremont, CA (US); Kalyan Ram Palagummi, Dublin, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 15/884,751

(22) Filed: Jan. 31, 2018

(51) Int. Cl.
*H04L 29/08* (2006.01)
*H04L 9/08* (2006.01)
(Continued)

(52) U.S. Cl.
CPC ...... *G06F 21/6263* (2013.01); *G06F 9/45558* (2013.01); *H04L 9/0816* (2013.01);
(Continued)

(58) Field of Classification Search
CPC .... G06F 21/6263; G06F 21/31; G06F 21/335; G06F 9/45558; H04L 9/0816; H04L 9/083; H04L 67/2842; H04L 67/1008; H04L 67/06; H04L 63/0236; H04L 63/0428; H04L 51/32; H04L 9/32; H04L 63/08; H04L 67/303; H04L 63/102;
(Continued)

(56) References Cited

U.S. PATENT DOCUMENTS 8,635,305 B1 * 1/2014 Subramaniam ..... G06F 16/9574 709/219
8,959,650 B1 * 2/2015 Richards ............... G06F 21/335 726/26

(Continued)

FOREIGN PATENT DOCUMENTS

WO   WO-2014133362 A1 *   9/2014   ............. G06Q 30/06

OTHER PUBLICATIONS

The Content Delivery Network System based on Cloud Storage by Yuedui Wang, Xiangming Wen, Young Sun, Zhenmin Zhao and Tianpu Yang pp. 5; (Year: 2011).*

(Continued)

*Primary Examiner* — Samson B Lemma
*Assistant Examiner* — Ali H. Cheema
(74) *Attorney, Agent, or Firm* — Ryan, Mason & Lewis, LLP (57) ABSTRACT

Methods and apparatus are provided for delivering segment-based electronic content. One method for providing segment-based electronic content comprises: obtaining a request for the segment-based electronic content, wherein the request comprises an encrypted cookie previously provided to a device of a user associated with the request by an origin server using a handshake protocol, wherein the encrypted cookie comprises a fingerprint and a segment key identifying one of a plurality of predefined user segments of the user; processing the encrypted cookie to evaluate whether the user is authorized to access the segment-based electronic content based on the fingerprint; and providing (Continued)

the segment-based electronic content to the user of the one predefined user segment if the user is authorized.

20 Claims, 4 Drawing Sheets (51) Int. Cl.

| | | |
|---|---|---|
| *G06F 21/62* | (2013.01) | |
| *G06F 21/31* | (2013.01) | |
| *G06F 9/455* | (2018.01) | |
| *G06F 21/33* | (2013.01) | |
| *H04L 29/06* | (2006.01) | |
| *H04L 9/32* | (2006.01) | |
| *G06Q 30/02* | (2012.01) | |

(52) U.S. Cl.
CPC ............ *G06F 21/31* (2013.01); *G06F 21/335* (2013.01); *G06Q 30/0255* (2013.01); *H04L 9/083* (2013.01); *H04L 9/32* (2013.01); *H04L 63/0236* (2013.01); *H04L 63/0428* (2013.01); *H04L 63/08* (2013.01); *H04L 63/102* (2013.01); *H04L 63/1441* (2013.01); *H04L 67/02* (2013.01); *H04L 67/06* (2013.01); *H04L 67/1008* (2013.01); *H04L 67/1095* (2013.01); *H04L 67/2814* (2013.01); *H04L 67/2842* (2013.01); *H04L 67/303* (2013.01)

(58) Field of Classification Search
CPC ............ H04L 63/1441; H04L 67/2814; H04L 67/1095; H04L 67/02; H04N 21/2393; H04N 21/23406; H04N 21/812; H04H 60/58; G06Q 30/0255
USPC ........ 713/167, 168, 171; 709/214, 217, 228; 725/18, 13; 715/745; 726/4, 26, 10
See application file for complete search history.

(56) References Cited

U.S. PATENT DOCUMENTS

| | | | | |
|---|---|---|---|---|
| 9,509,804 | B2* | 11/2016 | Stevens | H04L 67/2814 |
| 10,015,251 | B2* | 7/2018 | Deen | H04N 21/2393 |
| 10,154,109 | B2* | 12/2018 | Yanagihara | H04L 67/2842 |
| 10,270,792 | B1* | 4/2019 | Shemesh | H04L 63/1441 |
| 10,560,726 | B2* | 2/2020 | Wagenaar | H04L 67/02 |
| 10,630,771 | B1* | 4/2020 | Garza | H04L 67/1095 |
| 10,911,217 | B1* | 2/2021 | Umezurike | H04L 9/3231 |
| 2003/0204602 | A1* | 10/2003 | Hudson | H04L 67/06 709/228 |
| 2005/0044561 | A1* | 2/2005 | McDonald | H04H 60/58 725/18 |
| 2007/0180048 | A1* | 8/2007 | Crick | G06F 21/335 709/217 |
| 2007/0288588 | A1* | 12/2007 | Wein | H04L 67/1008 709/214 |
| 2008/0092058 | A1* | 4/2008 | Afergan | H04L 67/303 715/745 |
| 2008/0289025 | A1* | 11/2008 | Schneider | H04L 63/123 726/10 |
| 2011/0150099 | A1* | 6/2011 | Owen | H04N 21/23406 375/240.26 |
| 2013/0080777 | A1* | 3/2013 | Martell | H04L 9/083 713/168 |
| 2013/0219178 | A1* | 8/2013 | Xiques | H04L 63/08 713/168 |
| 2013/0227283 | A1* | 8/2013 | Williamson | H04L 9/32 713/168 |
| 2013/0227284 | A1* | 8/2013 | Pfeffer | H04L 63/0236 713/168 |
| 2014/0237496 | A1* | 8/2014 | Julian | H04N 21/812 725/13 |
| 2014/0278972 | A1* | 9/2014 | Yonebahashi | G06Q 30/0255 705/14.53 |
| 2014/0304507 | A1* | 10/2014 | Coppola | H04L 63/0428 713/167 |
| 2015/0052584 | A1* | 2/2015 | Rudraraju | H04L 63/102 726/4 |
| 2017/0344650 | A1* | 11/2017 | Reinisch | H04L 51/32 |

OTHER PUBLICATIONS

Improvement of Content Delivery in Mobile Social Networks by Rizwan Akhtar, Supeng Leng, Fan Wu and Imran Memon (Key Lab of Optical Sensing and Communications) pp. 5; (Year: 2013).*
Feel Free to Cache: Towards an Open CDN Architecture for Cloud-based Content Distribution by Zhi-Li Zhang Dept. of Computer Science & Engineering University of Minnesota, Minneapolis, MN 55455 pp. 3; (Year: 2014).*
Network of Information (NetInf)—An information-centric networking architecture BY Christian Dannewitz, Dirk Kutscher, Börje Ohlman, Stephen Farrell, Bengt Ahlgren, Holger Karl pp. 15; Jan. 27, 2013.*

* cited by examiner

```
200
┌─────────────────────────────────────────────────────────────┐
│ COOKIE SECURITY VARIABLES: USED BY CDN 120 TO DETERMINE     │
│ USER SEGMENT (BUCKET) OF A USER:                            │
│                                                             │
│ 210 • CACHE SEGMENT KEY (BUSKET ID)                         │
│                                                             │
│ 220 • SESSION EXPIRATION DATE (IDLE TIME)                   │
│                                                             │
│ 230 • MAX SESSION EXPIRATION DATE                           │
│                                                             │
│ 240 • HMAC-SHA256 FINGERPRINT (ENCRYPT CHANNEL WITH         │
│       FINGERPRINT 240 AND SHARED KEY)                       │
└─────────────────────────────────────────────────────────────┘
```

SEGMENT-BASED PERSONALIZED CACHE ARCHITECTURE

FIELD

The field relates generally to the distribution of electronic content over a network.

BACKGROUND

A content delivery network (CDN) (also referred to as a content distribution network), such as the CDN provided by Akamai Technologies of Cambridge, Mass., is a geographically distributed network of proxy servers and data centers that cache content from origin application servers geographically close to distributed global users. CDNs aim to distribute service spatially, relative to end users, to provide high availability and high performance. CDNs currently serve a large portion of Internet content, including web objects (such as text and graphics; applications); downloadable objects (e.g., media files and software); streaming media; and social network content.

To provide dynamic and personalized content to a target user segment, each request must be processed by the original application server. The application server must dynamically determine the appropriate content to return to the user at run time, which has been found to be inefficient, with poor performance and an unsatisfactory user experience.

A need therefore exists for techniques for delivering segment-based content using CDNs. A further need exists for secure role-based access to segment-based content distributed by such CDNs.

SUMMARY

In some embodiments, methods and apparatus are provided for delivering segment-based electronic content. An exemplary method for providing segment-based electronic content comprises: obtaining a request for the segment-based electronic content, wherein the request comprises an encrypted cookie previously provided to a device of a user associated with the request by an origin server using a handshake protocol, wherein the encrypted cookie comprises a fingerprint and a segment key identifying one of a plurality of predefined user segments of the user; processing the encrypted cookie to evaluate whether the user is authorized to access the segment-based electronic content based on the fingerprint; and providing the segment-based electronic content to the user of the one predefined user segment if the user is authorized.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods and apparatus for delivering segment-based electronic content.

Enterprise marketing platforms, such as the Digital Experience and Services (DES) platform provided by Dell EMC of Hopkinton, Mass., often provide a number of externally facing applications that deliver digital experiences for employees, customers, partners and public users, based on their roles and access privileges, across the globe. As noted above, there is a need for secure role-based access to segment-based content distributed by CDNs.

In one or more embodiments, segment-based electronic content is provided by at least one server of a CDN in response to a request for the electronic content. According to one aspect of the invention, the request includes a cookie comprising a fingerprint and a segment key identifying one of a plurality of predefined user segments of the user associated with the request. The cookie can be generated by the origin server associated with the requested content, for example, the first time that a user of the particular segment requests the electronic content. The origin server optionally stores the electronic content in a CDN cache.

In some embodiments, requests for segment-based electronic content include an encrypted cookie that comprises a fingerprint and a segment key identifying a predefined user segment of the user. The encrypted cookie is processed to evaluate whether the user is authorized to access the segment-based electronic content based on the fingerprint. The segment-based electronic content is provided to the user of the predefined user segment if the user is authorized.

In one or more embodiments, the CDN server(s) communicate with the origin server using a handshaking protocol to obtain the requested content, if not already cached, and to evaluate the request using the fingerprint stored in the cookie. In addition, the CDN server(s) process the cookie to determine if the cookie is valid for this particular user (for example, by matching a fingerprint computed by the CDN server to the fingerprint received in the cookie). If the cookie is valid for the particular user, the CDN server(s) provide the electronic content to the user. Generally, segment-based content caching is determined based on a virtual segment that the user was assigned after an initial authentication with the origin server. In some embodiments, the segment of the user is calculated based on the entitlements available in the user profile that are assigned, for example at the time of user registration and/or authentication.

In this manner, one or more CDN servers can cache and securely serve segment-based content to authorized users. A handshaking protocol is employed by the origin server to inform the CDN server(s) about the segment and the corresponding content. The handshaking protocol can be secured, for example, using one or more of the fingerprint stored in the cookie and a shared secret key. Generally, the handshaking process dynamically sets parameters of the communications channel established between the CDN servers and the origin servers before normal communications begin.

Upon a first user request for a given segment-based content item, the origin server (often referred to as an application server) returns the targeted content with a segment marker (e.g., a bucket identifier) that the CDN servers process and interpret. In addition, the application server also provides an encrypted fingerprint. The segment marker and fingerprint are passed to the CDN servers as part of the cookie included with requests for the segment-based content. The CDN will use the segment marker and the fingerprint to create and manage personalized content cache at the edge servers. In some embodiments, any subsequent request with the same cookie value will first be checked for validity, irrespective of the user, and if valid, checked against the local segment-based content cache, before forwarding the request to the origin server.

Figure 1:
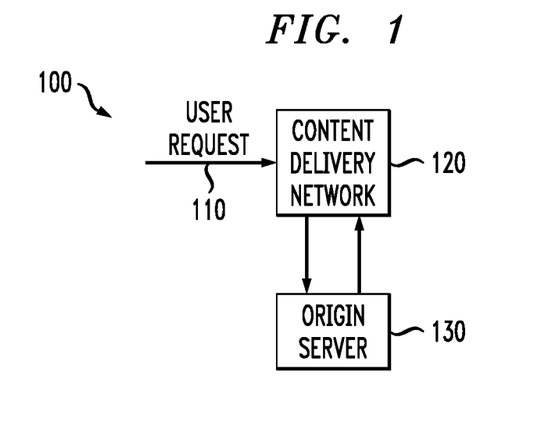
FIG. 1 illustrates the processing of a user request by one or more servers of a CDN, according to an embodiment of the disclosure.

FIG. 1 illustrates a content delivery network 100 where a user request 110 is processed by one or more servers of a CDN 120, according to an embodiment of the disclosure. Generally, CDN servers are known to take the initial load. For example, user requests 110 for an origin server 130 (e.g., www.dell.com) are initially processed by a CDN server. The CDN 120 is aware of the configuration of the origin server 130 and the CDN 120 executes the rules specified by the origin server 130 against user permissions. For example, the rules specified by the origin server 130 may define when and how to authenticate a user, when to serve content from a cache of the CDN 120; and when to return to the origin server 130 to refresh cached content.

As noted above, in one or more embodiments, the CDN 120 provides segment-based electronic content in response to user requests 110 for the electronic content. The requests 110 include a cookie comprising a fingerprint and a segment key identifying one of a plurality of predefined user segments of the user associated with the request 110. One or more servers of the CDN 120 communicate with the origin server 130 using a handshaking protocol to evaluate the request 110 using the fingerprint stored in the cookie.

As discussed further below, the origin server 130 generates the cookie (e.g., comprising a fingerprint and a segment key identifying the corresponding user segment) a first time a user of a particular user segment provides a request 110 for the segment-based electronic content. The origin server 130 provides the segment-based electronic content with the cookie to one or more servers of the CDN 120. Thereafter, the one or more servers of the CDN 120 can securely serve the segment-based electronic content from a cache based on the segment key specified in the cookie provided with the user request 110.

Figure 2:
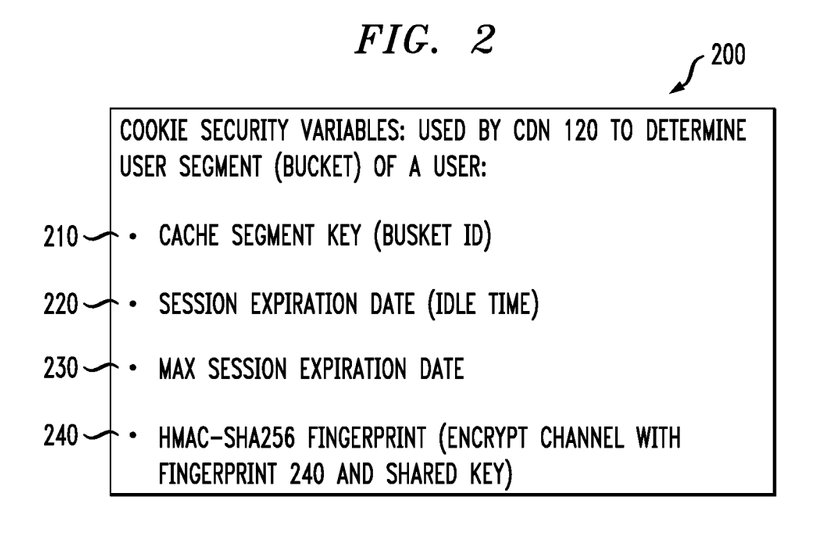
FIG. 2 illustrates an exemplary cookie comprising a plurality of exemplary cookie security variables, according to some embodiments of the disclosure.

FIG. 2 illustrates an exemplary cookie 200 comprising a plurality of exemplary cookie security variables, according to some embodiments of the disclosure. The exemplary cookie 200 is provided to the CDN 120 with a user request 110 and the exemplary cookie security variables within the cookie 200 are used by the CDN 120 to determine, for example, the user segment (bucket) of a particular user.

In the embodiment of FIG. 2, the exemplary cookie security variables within the cookie 200 comprise a cache segment key 210, a session expiration date 220, a maximum session expiration date 230 and a fingerprint 240. The cache segment key 210 identifies the user segment or bucket associated with the corresponding segment-based content.

The cache segment key 210 segments the request 110 to the appropriate cache segment. Each segment-based user is assigned a cache segment key 210 at the time of login and/or registration. The cache segment key 210 is used by the CDN 120 to cache and retrieve the segment-based content from the appropriate cache. In at least one embodiment, the cache segment key 210 is a string value. The cache segment key 210 is used by the CDN 120 to determine the particular user cache segment along with the content URL from the request 110.

The session expiration date 220 corresponds to an expiration time of an origin session. Generally, the session expiration date 220 comprises a predefined idle time that requires that the user re-authenticate with the origin server 130 upon expiration of the idle time. The session expiration date 220 can be expressed, for example, as an integer, using a Unix time format.

The maximum session expiration date 230 specifies the expiration time for a given user session (e.g., the duration for which the user's credentials are valid). Generally, when the maximum session expiration date 230 expires, the current credentials of the user are rejected by the CDN 120, bypassing the cache, and the user request 110 is forwarded to the origin server 130 (requiring the user to login again to obtain the desired content). The maximum session expiration date 230 can be expressed, for example, as an integer, using a Unix time format.

The fingerprint 240 comprises an encrypted key used by the CDN 120 to validate the user cookie included with user requests 110. The fingerprint 240 may be generated, for example, using the Hashed Message Authentication Code (HMAC) in conjunction with the SHA-256 Cryptographic Hash Algorithm. In some embodiments, the fingerprint 240 is generated as a concatenation of a plurality of the cache segment key 210, the session expiration date 220, the maximum session expiration date 230 and a shared private key (and possibly one or more additional values). A given request 110 is rejected if the fingerprint 240 computed by the CDN 120 server does not match the fingerprint 240 in the cookie 200 received with the request 110.

In one or more embodiments, if one or more of cookie security variables are empty, missing, or invalid, security will be rejected, the CDN cache will be bypassed, and the request 110 is forwarded to the origin server 130.

Figure 3:
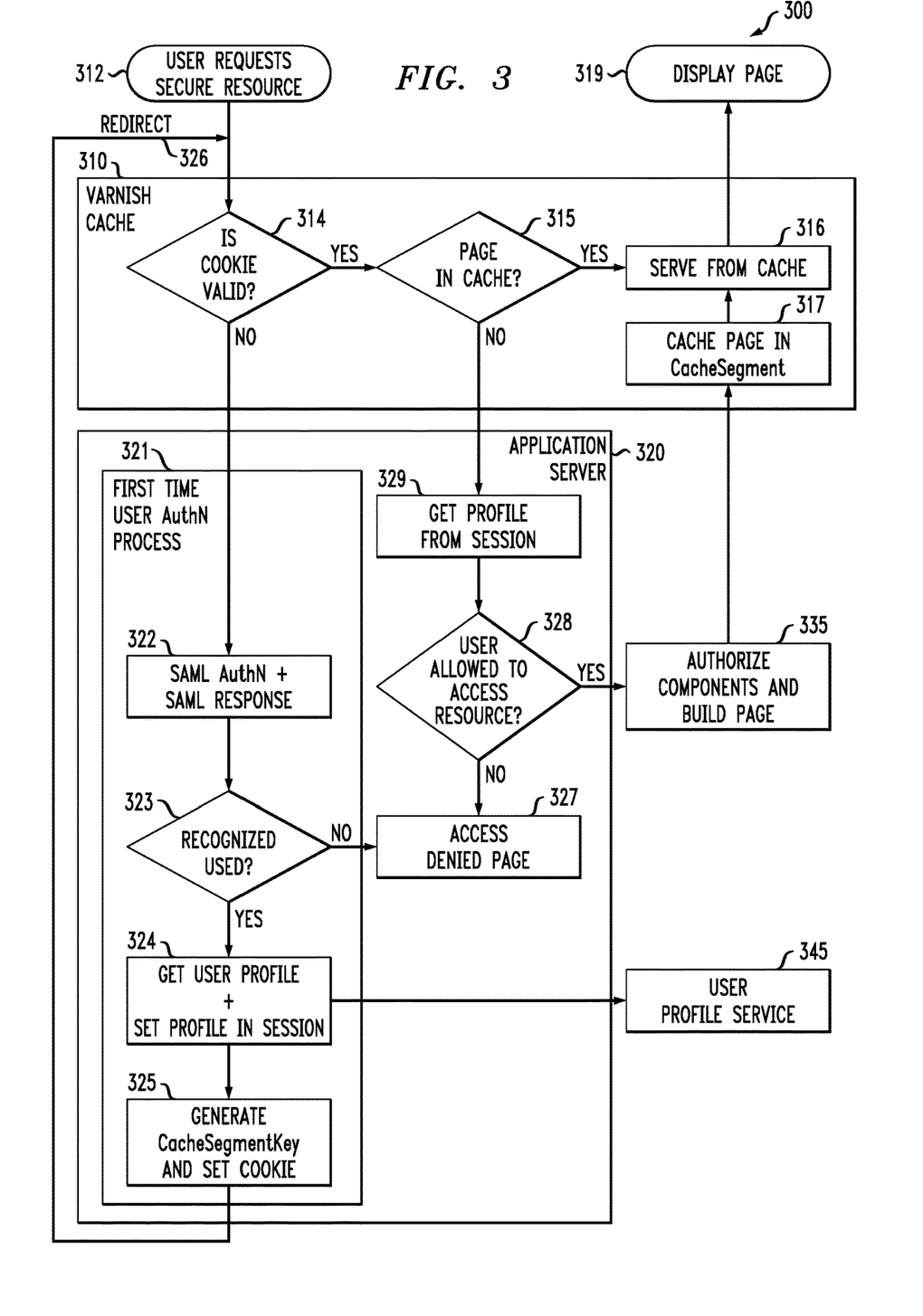
FIG. 3 is a flow chart illustrating an exemplary implementation of a segment-based origin server process, according to one embodiment.

FIG. 3 is a flow chart illustrating an exemplary implementation of a segment-based origin server process 300, according to one embodiment of the disclosure. As shown in FIG. 3, a varnish cache 310 receives a user request 312 for a secure resource. Generally, a varnish cache 310 is a web application accelerator (also referred to as a caching HTTP reverse proxy) that is installed in front of an HTTP application server that is configured to cache the contents of the HTTP server to improve performance.

A test is performed during step 314 to determine if the cookie received with the request is valid. As noted above, the validity of the cookie indicates whether the user is authentic and authorized. If it is determined during step 314 that the cookie is valid, then the varnish cache 310 determines if the requested page is in a cache during step 315. If the requested page is in a cache, then the varnish cache 310 serves the page from the cache during step 316 and the page is displayed during step 319.

If the requested page is not in a cache of the 310 (determined at step 315), then the application server 320 gets a profile from the session during step 329 and determines if the user is allowed to access the requested resource during step 328. If the user is not allowed to access the requested resource, an access denied page is presented during step 327. If the user is allowed to access the requested resource, the necessary page components are authorized during step 335 and the page is built. The page is then cached in the appropriate cache segment during step 317 and continues in the manner described above for step 316.

If, however, it is determined during step 314 that the cookie is not valid, then the application server 320 executes a first time user authentication process 321 (may also apply to a user requiring re-authentication after a session or idle timeout). The exemplary first time user authentication process 321 employs a Security Assertion Markup Language (SAML) authentication and obtains a SAML response during step 322. The exemplary first time user authentication process 321 determines if the user is a recognized user (e.g., a customer or partner) during step 323. If the user is not a recognized user (determined at step 323), an access denied page is presented during step 327.

If the user is a recognized user (determined at step 323), the first time user authentication process 321 obtains the user profile and sets the profile in the session during step 324, and then generates the cache segment key and sets the cookie for the content during step 325. The request is then redirected at step 326. The profile from step 324 is also provided to a user profile service 345.

Figure 4:
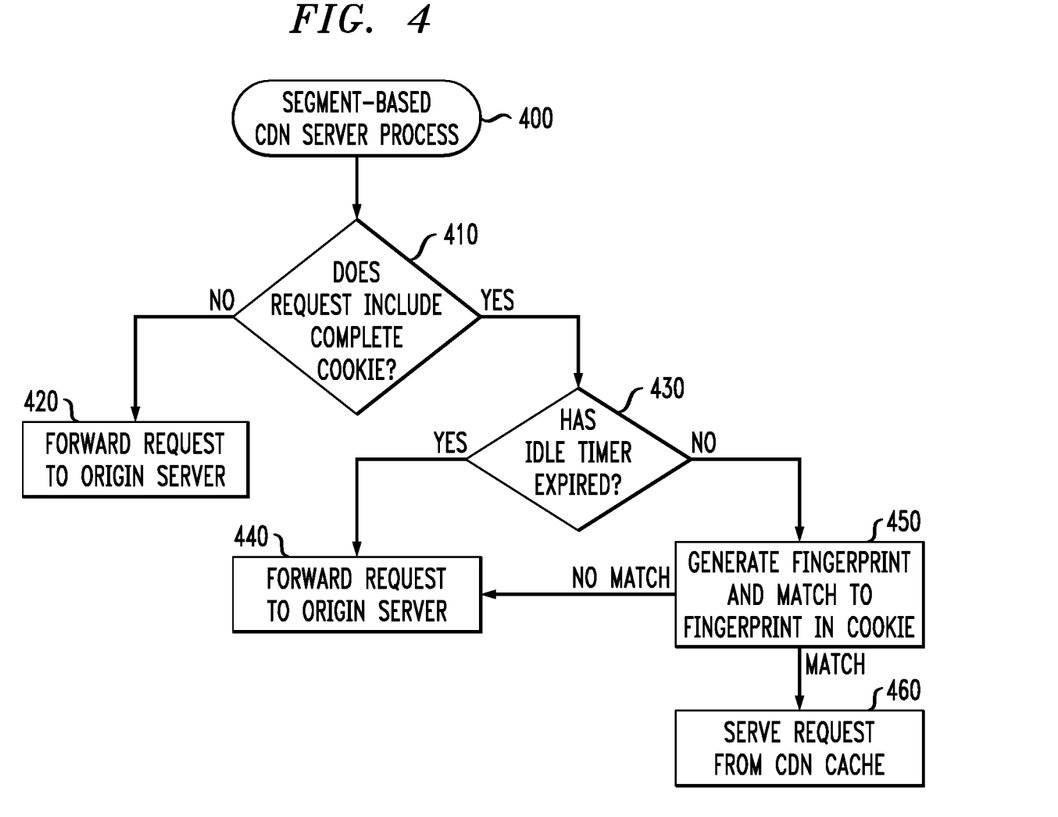
FIG. 4 is a flow chart illustrating an exemplary implementation of a segment-based CDN server process, according to an embodiment.

FIG. 4 is a flow chart illustrating an exemplary implementation of a segment-based CDN server process 400, according to one embodiment of the disclosure. As shown in FIG. 4, the exemplary segment-based CDN server process 400 initially receives a user request. A test is performed by the CDN server 120 during step 410 to determine if the request includes a complete cookie. If it is determined during step 410 that the request does not include a complete cookie, then the request is forwarded during step 420 to the origin server 130.

If it is determined during step 410 that the request includes a complete cookie, then a test is performed during step 430 to determine if the idle timer has expired. Generally, requests received within the predefined idle time (e.g., no user session activity) are processed as a recognized user. Otherwise, the cookie expires and the user must re-authenticate with the origin server. Thus, if it is determined during step 430 that the idle timer has expired, then the request is forwarded during step 440 to the origin server 130 (e.g., the origin server 130 will reset the time or the user will log in again).

If the idle timer has not expired at step 430, then the segment-based CDN server process 400 generates a fingerprint for the request during step 450 and compares the generated fingerprint to the fingerprint received with the request. If the fingerprints do not match, then the request is forwarded during step 440 to the origin server 130, as described above.

If the fingerprints match, then the request is served from the CDN cache during step 460. While the exemplary embodiments have been described using exemplary CDN servers and origin servers for the delivery of segment-based electronic content using HTTPS (HTTP Secure) for secure communications over a computer network, the disclosed content segmenting techniques can be employed for the secure delivery of other communication protocols, such as the file transfer protocol (FTP). In addition, while the exemplary embodiments employ CDN servers as the agents for distributed delivery of electronic content, on behalf of the primary content providers (e.g., origin servers), other principal/agent relationships can exist and the terms "content delivery network" (or components thereof) and "origin servers" are meant to generally convey the agent and principal parties, respectively, involved in the distribution of segment-based electronic content.

In some embodiments, the disclosed segment-based electronic content techniques improve the delivery of personalized electronic content and the tailoring of electronic content to particular user segments (e.g., customers, vendors and business partners).

Among other benefits, the disclosed segment-based electronic content techniques provide secure content delivery using encrypted cookies that include a fingerprint and a segment key identifying the predefined user segment of a particular user. Some embodiments of the disclosure deliver secured content to a user with high performance and low time-to-interact response times, while also enabling high availability, scalability and stability of origin systems by leveraging globally distributed CDN servers.

In some embodiments, requests for segment-based electronic content include an encrypted cookie that comprises a fingerprint and a segment key identifying a predefined user segment of the user. The encrypted cookie is processed to evaluate whether the user is authorized to access the segment-based electronic content based on the fingerprint. The segment-based electronic content is provided to the user of the predefined user segment if the user is authorized.

The foregoing applications and associated embodiments should be considered as illustrative only, and numerous other embodiments can be configured using the techniques disclosed herein, in a wide variety of different applications.

It should also be understood that the disclosed segment-based electronic content techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed segment-based electronic content techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components of the content delivery network 100 are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a segment-based electronic content environment in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
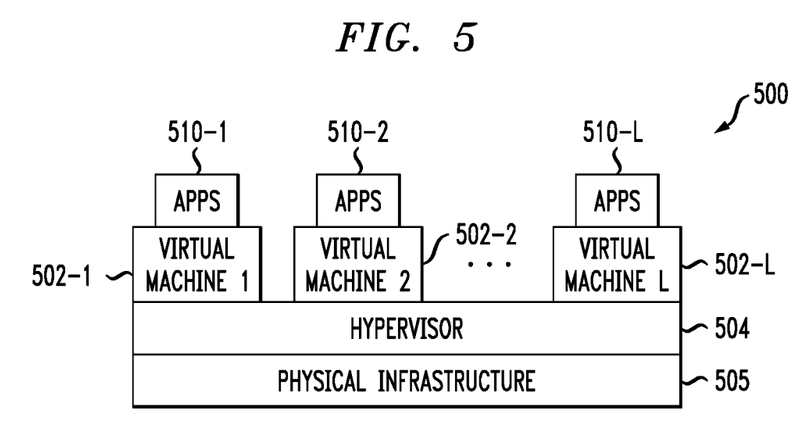
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 504 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the content delivery network 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed segment-based content delivery network may each run on a computer, server, storage device or other processing platform element. A given such element may be viewed as an example of what is more generally referred to herein as a "processing device." The cloud infrastructure 500 shown in FIG. 5 may represent at least a portion of one processing platform.

Figure 6:
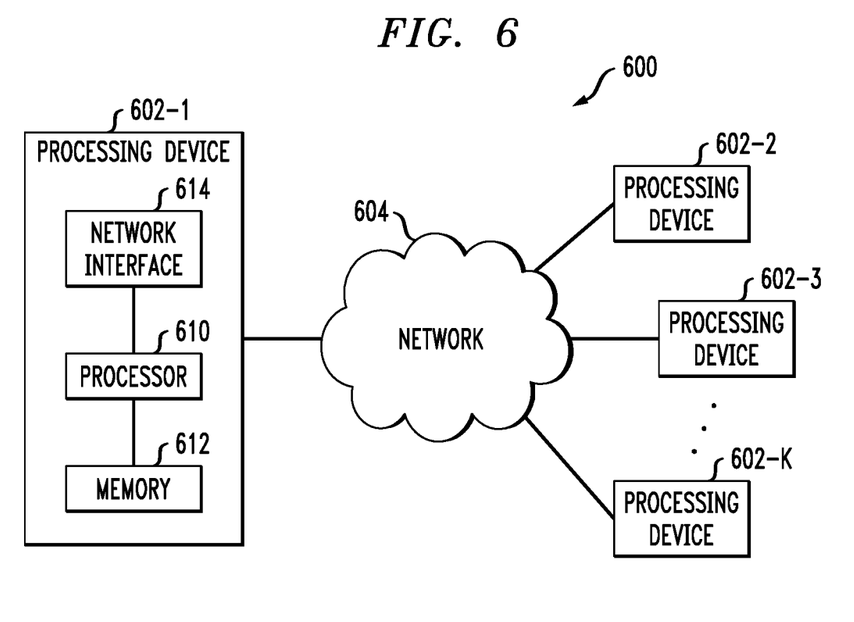
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 3 and 4, for example, are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for providing segment-based electronic content, comprising:

obtaining, by at least one server of a content delivery network, said segment-based electronic content and an encrypted cookie from an origin server, wherein the encrypted cookie is generated by the origin server for a device of a user associated with an initial request for said segment-based electronic content, and wherein the encrypted cookie comprises (i) a fingerprint and (ii) a segment key identifying one of a plurality of predefined user segments of said user in a local cache of said at least one server of said content delivery network, wherein communications between the at least one server of said content delivery network and the origin server are encrypted using said fingerprint stored in said encrypted cookie and a shared secret key;

storing said segment-based electronic content in said local cache of said at least one server of said content delivery network;

obtaining, by said at least one server of said content delivery network, a further request for said segment-based electronic content wherein said further request comprises the encrypted cookie;

processing, by said at least one server of said content delivery network, said encrypted cookie of said further request to evaluate whether said user is authorized to access said segment-based electronic content based on said fingerprint;

in response to determining that said user is authorized, providing, by said at least one server of said content delivery network, said segment-based electronic content from said local cache to said user of said one predefined user segment without forwarding said further request to said origin server; and in response to determining that said user is not authorized:

bypassing said local cache for said further request in response to a fingerprint, computed by the at least one server of said content delivery network, not matching the fingerprint in the encrypted cookie received with the further request; and forwarding said further request to said origin server.

2. The method of claim 1, further comprising the step of determining whether the user associated with said further request has been authenticated based on said encrypted cookie.

3. The method of claim 1, further comprising the step of determining whether said segment-based electronic content is stored in said local cache.

4. The method of claim 1, wherein said origin server generates said encrypted cookie a first time a user of said one predefined user segment provides said initial request for said segment-based electronic content, and wherein said segment-based electronic content is obtained from said origin server using a handshake protocol.

5. The method of claim 1, further comprising the step of evaluating said further request against one or more time limit thresholds.

6. The method of claim 1, wherein the fingerprint of the encrypted cookie is generated based on at least one of a hashed message authentication code and a secure hash algorithm.

7. A system for providing segment-based electronic content, comprising:
   a non-transitory memory; and
   at least one hardware processing device, coupled to the memory, operative to implement the following steps:
   obtaining, by at least one server of a content delivery network, said segment-based electronic content and an encrypted cookie from an origin server, wherein the encrypted cookie is generated by the origin server for a device of a user associated with an initial request for said segment-based electronic content, and wherein the encrypted cookie comprises (i) a fingerprint and (ii) a segment key identifying one of a plurality of predefined user segments of said user in a local cache of said at least one server of said content delivery network, wherein communications between the at least one server of said content delivery network and the origin server are encrypted using said fingerprint stored in said encrypted cookie and a shared secret key;
   storing said segment-based electronic content in said local cache of said at least one server of said content delivery network;
   obtaining, by said at least one server of said content delivery network, a further request for said segment-based electronic content wherein said further request comprises the encrypted cookie;
   processing, by said at least one server of said content delivery network, said encrypted cookie of said further request to evaluate whether said user is authorized to access said segment-based electronic content based on said fingerprint;
   in response to determining that said user is authorized, providing, by said at least one server of said content delivery network, said segment-based electronic content from said local cache to said user of said one predefined user segment without forwarding said further request to said origin server; and
   in response to determining that said user is not authorized:
   bypassing said local cache for said further request in response to a fingerprint, computed by the at least one server of said content delivery network, not matching the fingerprint in the encrypted cookie received with the further request; and
   forwarding said further request to said origin server.

8. The system of claim 7, further comprising the step of determining whether the user associated with said further request has been authenticated based on said encrypted cookie.

9. The system of claim 7, further comprising the step of determining whether said segment-based electronic content is stored in said local cache.

10. The system of claim 7, wherein said origin server generates said encrypted cookie a first time a user of said one predefined user segment provides said initial request for said segment-based electronic content, and wherein said segment-based electronic content is obtained from said origin server using a handshake protocol.

11. The system of claim 7, further comprising the step of evaluating said further request against one or more time limit thresholds.

12. The system of claim 7, wherein the fingerprint of the encrypted cookie is generated based at least in part on a hashed message authentication code.

13. The system of claim 7, wherein the fingerprint of the encrypted cookie is generated based at least in part on a secure hash algorithm.

14. A computer program product for providing segment-based electronic content, comprising a non-transitory machine-readable storage medium having encoded therein executable code of one or more software programs, wherein the one or more software programs when executed by at least one hardware processing device perform the following steps:
   obtaining, by at least one server of a content delivery network, said segment-based electronic content and an encrypted cookie from an origin server, wherein the encrypted cookie is generated by the origin server for a device of a user associated with an initial request for said segment-based electronic content, and wherein the encrypted cookie comprises (i) a fingerprint and (ii) a segment key identifying one of a plurality of predefined user segments of said user in a local cache of said at least one server of said content delivery network, wherein communications between the at least one server of said content delivery network and the origin server are encrypted using said fingerprint stored in said encrypted cookie and a shared secret key;
   storing said segment-based electronic content in said local cache of said at least one server of said content delivery network;
   obtaining, by said at least one server of said content delivery network, a further request for said segment-based electronic content wherein said further request comprises the encrypted cookie;
   processing, by said at least one server of said content delivery network, said encrypted cookie of said further request to evaluate whether said user is authorized to access said segment-based electronic content based on said fingerprint;
   in response to determining that said user is authorized, providing, by said at least one server of said content delivery network, said segment-based electronic content from said local cache to said user of said one predefined user segment without forwarding said further request to said origin server; and
   in response to determining that said user is not authorized:
   bypassing said local cache for said further request in response to a fingerprint, computed by the at least one server of said content delivery network, not matching the fingerprint in the encrypted cookie received with the further request; and
   forwarding said further request to said origin server.

15. The computer program product of claim 14, further comprising the step of determining whether the user associated with said further request has been authenticated based on said encrypted cookie.

16. The computer program product of claim 14, wherein said origin server generates said encrypted cookie a first time a user of said one predefined user segment provides said initial request for said segment-based electronic content, and wherein said segment-based electronic content is obtained from said origin server using a handshake protocol.

17. The computer program product of claim 14, further comprising the step of evaluating said further request against one or more time limit thresholds.

18. The computer program product of claim 14, further comprising the step of determining whether said segment-based electronic content is stored in said local cache.

19. The computer program product of claim 14, wherein the fingerprint of the encrypted cookie is generated based at least in part on a hashed message authentication code.

20. The computer program product of claim 14, wherein the fingerprint of the encrypted cookie is generated based at least in part on a secure hash algorithm.

\* \* \* \* \*